United States Patent [19]

Iwata et al.

[11] Patent Number: 4,672,249

[45] Date of Patent: Jun. 9, 1987

[54] SUBMERSIBLE ELECTRIC MOTOR HAVING FLOATING BEARINGS

[75] Inventors: Minoru Iwata; Nobuyuki Kuji, both of Tokyo, Japan

[73] Assignee: Ebara Corporation, Tokyo, Japan

[21] Appl. No.: 811,463

[22] Filed: Dec. 20, 1985

[30] Foreign Application Priority Data

Dec. 25, 1984 [JP] Japan ................. 59-276709

[51] Int. Cl.$^4$ ............ H02K 7/08; F16C 17/04; F04D 13/08
[52] U.S. Cl. ........................ 310/90; 310/87; 384/223
[58] Field of Search .............. 310/87, 90, 157; 384/215, 223, 225

[56] References Cited

U.S. PATENT DOCUMENTS

| 2,740,908 | 4/1956 | Dochterman | 310/87 |
| 3,116,432 | 12/1963 | Ekey | 310/87 |
| 3,816,782 | 6/1974 | Dow et al. | 310/90 |
| 4,033,647 | 7/1977 | Beavers | 384/223 |
| 4,329,122 | 5/1982 | Owada et al. | 310/90 |

FOREIGN PATENT DOCUMENTS 40-18962 7/1965 Japan.

Primary Examiner—Patrick R. Salce
Assistant Examiner—D. L. Rebsch
Attorney, Agent, or Firm—Oblon, Fisher, Spivak, McClelland & Maier

[57] ABSTRACT

A submersible electric motor for use in submersible pump or the like, in which an upright motor shaft is supported by upper and lower thrust bearings for supporting upward and downward thrust loads, respectively, and thrust pads of the upper and the lower thrust bearings receive upper and lower slide contact members secured to the motor shaft in its upper and lower portions, and in which resilient means such as coil springs or rubber bushings bias the thrust pads of the upper thrust bearing, suspension mounted to the motor frame, towards the upper thrust contact member secured to the motor shaft. This thrust bearing for supporting an upward thrust given to the motor shaft may be applicable to various electric motors.

10 Claims, 5 Drawing Figures

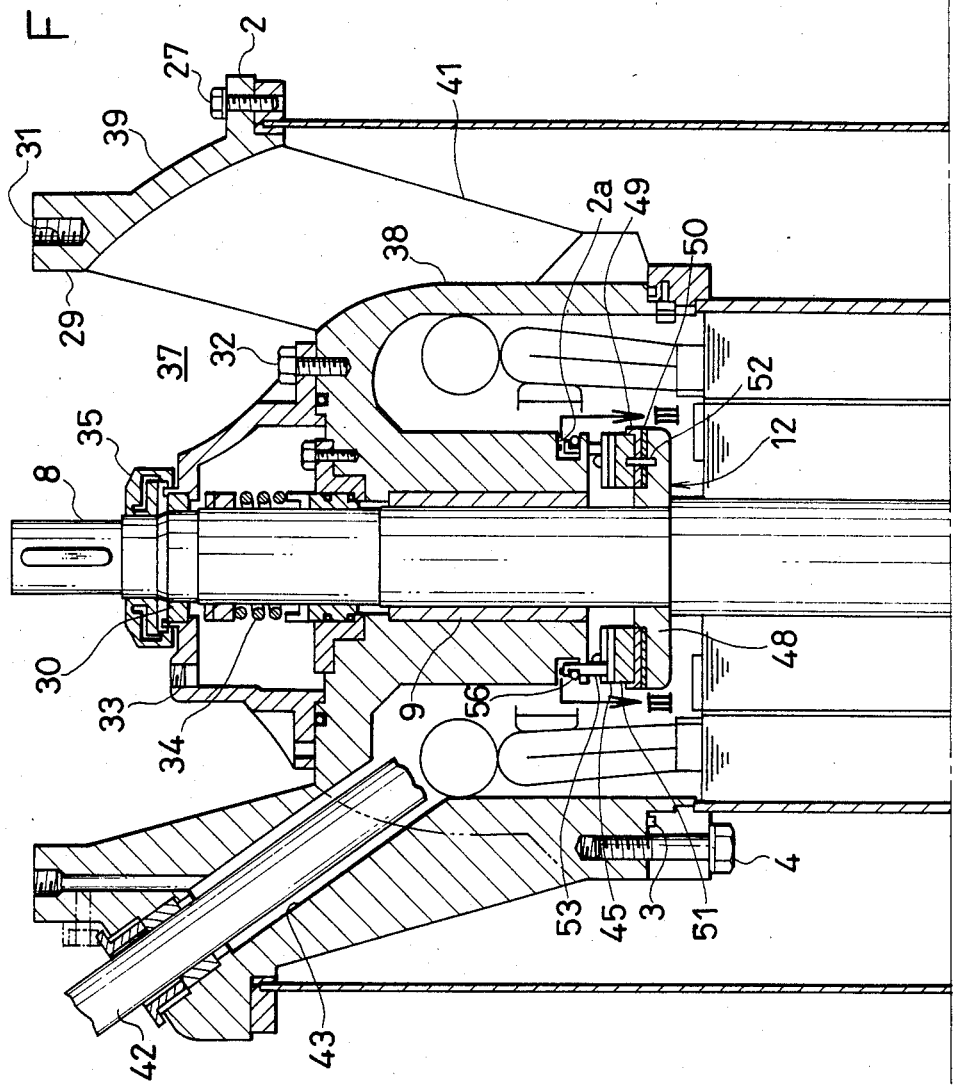

1

SUBMERSIBLE ELECTRIC MOTOR HAVING FLOATING BEARINGS

BACKGROUND OF THE INVENTION

The present invention relates to a submersible electric motor for use in a submersible pump or the like, and more particularly to a thrust bearing for supporting an upward thrust given to a shaft of the electric motor.

In a conventional submersible pump comprising a submersible electric motor arranged in its lower part and a pump unit arranged thereon in its upper part, a shaft of the electric motor extends upward into a pump casing of the pump unit and a pump impeller and a case ring are mounted to the shaft. The motor shaft is supported by upper and lower thrust bearings. A downward thrust load is usually supported by the lower bearing, and the upper thrust bearing for supporing an upward thrust load restricts the upward movement of the shaft when an upward thrust is given to the shaft.

The thrust loads of the upper and the lower bearings may be properly determined. For instance, an operating point of a pump is selected so that the lower and the upper thrust loads may be one ton (1000 kg.) and one tenth thereof i.e., 100 kg., respectively.

Therefore, the upper thrust bearing supporting the upward thrust load may be a solid type having an anular continuous slide surface such as an annular ring type and a collar having a flange type. Further, usually, the slide contact member of the upper thrust bearing does not contact the slide contact member of the shaft, that is, there is a space between the two contact surfaces of the upper thrust bearing and the shaft. When the thrust load is changed from the downward thrust to the upward thrust, the shaft is raised by the upward thrust, and then the slide contact member of the shaft contacts the slide contact member of the upper thrust bearing.

In the above described conventional upright submersible pump, on starting or operating under an excessive discharge amount, an upward thrust load is applied to the shaft. Accordingly, the operating point of the pump is restricted by the load capacity of the upper thrust bearing supporting the upward thrust load; and the discharge volume is adjusted by using a discharge valve. The upward thrust load on starting gives a shock to the upper thrust bearing, and thus a flange-form solid type thrust bearing is used. However, this type of thrust bearing has a disadvantage in that it has a small load capacity for supporting the upward thrust load during the continuous operation under the excessive discharge amount, and further, it is difficult to obtain a large bearing capacity. Hence, a floating type the bearing such as the Michell thrust bearing or the Kingsbury thrust bearing, and the like, having a large load capacity can be utilized as the upper thrust bearing. However, in such a bearing, there is a clearance 0.5–1.0 mm between thrust pads of an upper thrust bearing and a slide contact member made of a carbon material or a metallic material, which is attached to a motor shaft, and the thrust pads of the upper thrust bearing are not fixedly mounted to the upper bracket. Hence, trembling or vibration of the thrust pads is caused under certain conditions of the pads and the slide contact member.

It is considered that such trembling or vibration of the thrust pads is caused for the following reasons. The thrust pads hang their slide contact surfaces down on the bracket. The hydromechanics of upward thrust which is generated by the pump unit and is given to the motor shaft varies, and the weights of the rotor of the electric motor, the impeller and the like, mounted to the motor shaft, are applied to the motor shaft as a downward thrust. Therefore, the varying hydromechanic upward thrust applied to the shaft is always subtracted by the downward thrust applied by the weights of the members mounted to the shaft, and accordingly the variation rate of the upward thrust applied to the shaft is enlarged. When the upward thrust is small, the motor shaft is floating, and when the upward thrust is large, the contact pressure between the thrust pads of the upper thrust bearing and the slide contact member of the motor shaft becomes large, thereby enlarging the variation rate of the upward thrust applied to the motor shaft.

SUMMARY OF THE INVENTION

Accordingly, it is an object of the present invention to provide a submersible electric motor for use in a submersible pump or the like, including a thrust bearing, free from the aforementioned defects and disadvantages, which is capable of having a large thrust load capacity and preventing trembling or vibration of thrust pads.

It is another object of the present invention to provide a thrust bearing for supporting an upward thrust applied to an upright motor shaft of an electric motor, free from the aforementioned defects and disadvantages, which is capable of having a large thrust load capacity and preventing trembling or vibration of thrust pads.

According to the present invention, there is provided a submersible electric motor for use in a submersible pump or the like, in which an upright motor shaft is supported by upper and lower thrust bearings for supporting upward and downward thrust loads, respectively, and thrust pads of the upper and the lower thrust bearings receive upper and lower slide contact members secured to the motor shaft in its upper and lower portions, wherein the thrust pads of the upper thrust bearing suspension mounted to a frame of the electric motor, and resilient means are provided for biasing the thrust pads of the upper thrust bearing towards the upper slide contact member secured to the motor shaft.

According to the present invention, there is also provided a thrust bearing for supporting an upward thrust given to an upright motor shaft of an electric motor, comprising thrust pads suspension mounted to a frame of the electric motor and resilient means for biasing the thrust pads towards a slide contact member secured to the motor shaft.

Other and further objects, features and advantages of the invention will appear more fully from the following description with reference to the accompanying drawings, in which:

BRIEF DESCRIPTION OF THE DRAWINGS

FIG. 1a, 1b is a longitudinal cross sectional view of a submersible electric motor according to the present invention;

DESCRIPTION OF THE PREFERRED EMBODIMENTS

Figure 1B:
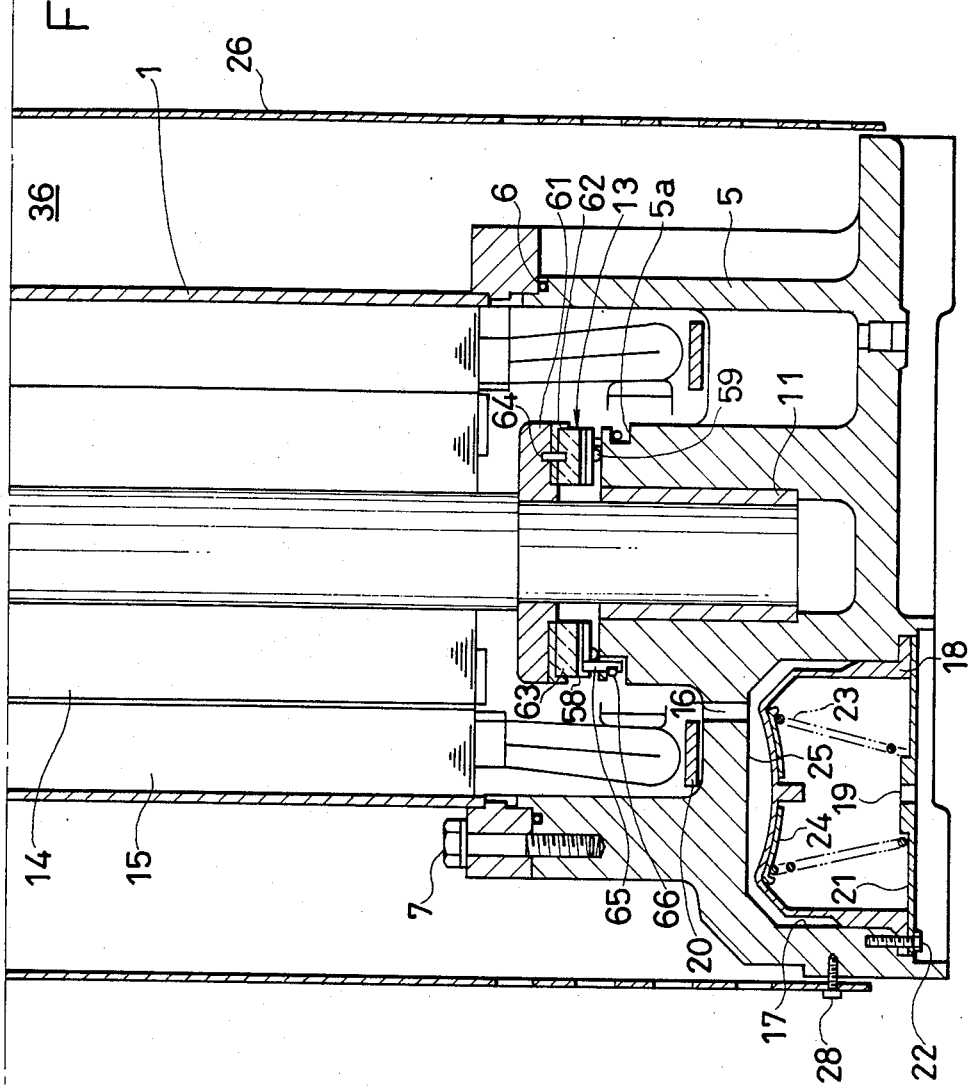
Figure 2:
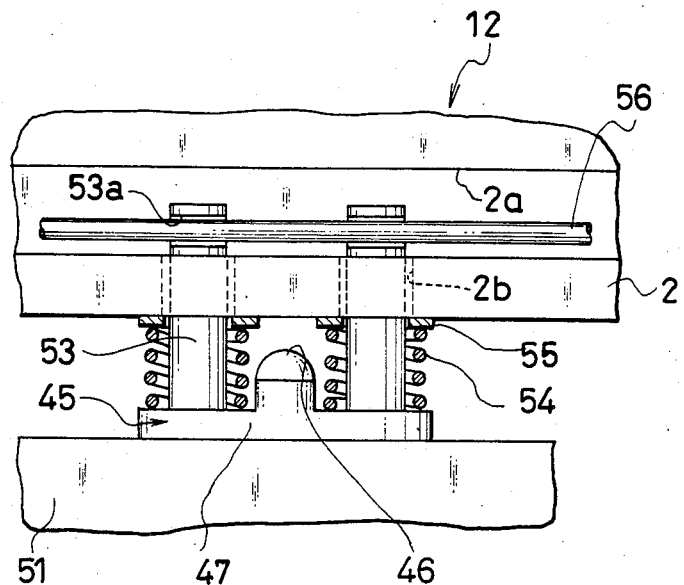
FIG. 2 is an enlarged fragmentary elevational view of a thrust bearing of the submersible electric motor of FIG. 1.
Figure 3:
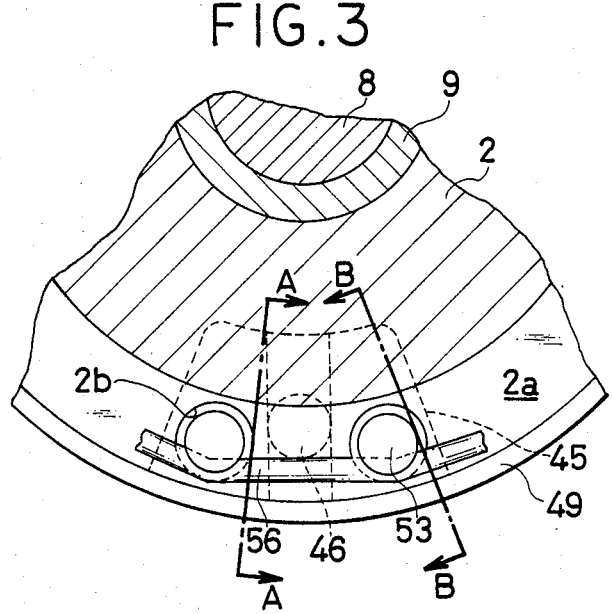
FIG. 3 is a fragmentary transverse cross sectional view, taken along the line III—III of FIG. 1.

Referring now to the drawings, wherein similar or corresponding components are designated by like reference numerals throughout the different figures, there is shown in FIGS. 1-3 a submersible electric motor for use in a submersible pump or the like according to the present invention.

In the drawings, a motor frame 1 is provided with upper and lower flanges in its upper and lower ends, and an upper bracket 2 is disposed onto the motor frame 1 via a sealing ring 3 such as an O-ring interposed therebetween by bolts 4. A lower bracket 5 is mounted to the lower end of the motor frame 1 via a sealing ring 6 such as an O-ring interposed therebetween by bolts 7. A motor shaft 8 is supported by upper and lower thrust bearings 12 and 13 of a floating type, which are mounted to the upper and the lower brackets 2 and 5 through radial metal bearing 9 and 11, respectively. The upper and lower thrust bearings 12 and 13, having the same thrust load capacity support upward and downward thrusts, respectively, given to the motor shaft 8.

A rotor 14 is mounted to the shaft 8 between the upper and the lower bearings 12 and 13, and a stator 15 surrounding the rotor 14 is secured to the motor frame 1. The lower bracket 5 is provided with a boss portion which the radial metal bearing 11 is inserted in, a horizontal wall 25 defining the lower end of a motor chamber and supporting a support rubber 20 for a lower coil end of the stator 15, and a diaphragm chamber 17 in its lower one side, connecting to the motor chamber through a penetrating hole 16 formed in the horizontal wall 25. In the diaphragm chamber 17, a diaphragm 18 having a flange in its opening is arranged and is mounted via a cover plate 21 having a central hole 19, which covers the flanged opening of the diaphragm 18, to the lower bracket 5 by bolts 22. A coil spring 23 having an upset truncated cone form is arranged in the diaphragm 18. The lower end of the spring 23 is fitted on a central projection of the cover plate 21 and the upper end of the spring 23 supports the upper wall of the diaphragm 18 via an annular plate 24 which is fitted on a central projection formed on the upper wall of the diaphragm 18.

A suction casing 26 having a plurality of suction openings in its lower portion, which is made of a metallic material, is mounted to the upper and the lower brackets 2 and 5 by bolts 27 and 28.

The upper bracket 2 is provided with a pump suction cover mount part 29 in its upper end and a plurality of female screwhole 31 are tapped in the pump suction cover mount part 29.

A shaft seal case 33 is disposed to the upper end of the upper bracket 2 by bolts 32 and the shaft 8 extends vertically through the shaft seal case 33. A mechanical seal 34 is arranged in the shaft seal case 33 and an oil seal 30 is inserted between the upper opening of the shaft seal case 33 and the shaft 8. A sand slinger 35 having a lip portion in its lower part is fitted on the shaft 8 over the oil seal 30 so that the lip portion may be fitted on the outer periphery of the cylindrical upper end of the shaft seal case 33 to seal the shaft 8.

The motor frame 1 and the suction casing 26 define a cylindrical suction passage 36. A suction passage 37 in the upper part of the upper bracket 2 leads to the suction passage 26 between the motor frame 1 and the suction casing 26, and the suction passage 37 is so formed that no water dead area may exsist and no swirl may be caused.

Between inner and outer members 38 and 39 of the upper bracket 2, a plurality of flow control plates 41 for controlling the discharge flow and connecting the two members 38 and 39 are disposed. In one of the flow control plates 41, a penetrating hole 43 for an electric cable 42 passing therethrough is formed.

In FIGS. 2 and 3, a floating type upper thrust bearing 12 is shown. The right and left sides of the upper thrust bearing 12 shown in FIG. 1 are respectively cut along the lines A—A and B—B of FIG. 3.

The upper thrust bearing 12 comprises a plurality of thrust pads 45, each housing a contact or support projection 46 and a slide contact member 47. The contact projection 46 positioned in the center of the thrust pad 45 may contact the upper bracket 2. An annular thrust disk 48 is secured to the shaft 8, and an annular thrust plate 51 is attached to the thrust disk 48 via an annular support member 49 and an annular shim 50 which may be made of a synthetic resin material or the like such as a polyester film. A plurality of stopper pins 52 (FIG. 1a) are inserted in the thrust disk 48 and the carbon thrust plate 51 through the support member 49 and the shim 50 to prevent the turning of the support member 49, the shim 50 and the carbon thrust plate 51 with respect to the thrust disk 48.

A pair of leg members 53 are attached to the thrust pad 45 on their one ends and each leg member 53 is provided with a slot 53a in the other end. The slotted ends of the leg members 53 project upward into an annular peripheral groove 2a formed in the lower end of a boss portion of the upper bracket 2 through holes 2b formed in the annular projection of the lowermost end of the boss portion of the upper bracket 2, resulting in that the thrust pad 45 is prevented from revolving around the shaft 8. A resilient string ring 56 such as an O-ring is disposed within the annular peripheral groove 2a of the upper bracket 2 through the slots 53a of the leg members 53, thereby suspension mounting the leg members 53 and thus preventing the thrust pad 45 from falling down off the upper bracket 2. A pair of coil springs 54 surrounding the leg members 53 are arranged between the thrust pad 45 and the lower end of the boss portion of the upper bracket 2 via washers 55 so as to bias the thrust pad 45 towards the carbon thrust plate 51.

Accordingly, when downward thrust load is given to the shaft 8, the lower thrust bearing 13 supports the downward thrust, and the coil springs 54 elongate their free lengths, while the thrust pad 45 possibly separate from the carbon thrust plate 51, or the coil springs 54 apply give a small contact pressure to the carbon thrust plate 51 while the thrust pad 45 contacts the carbon thrust plate 51. On this occasion, of course, the contact projection 46 of the thrust pad 45 is separated from the lower end of the boss portion of the upper bracket 2 with a certain gap therebetween.

On the other hand, when the upward thrust load is applied to the shaft 8, the shaft 8 is raised and the upper thrust bearing 12 supports the upward thrust. The pressing force of the coil springs 54 under the condition that the contact projection 46 of the thrust pad 45 contacts the lower end of the boss portion of the upper bracket 2, is so determined that the thrust pad 45 may be lifted by the upward thrust due to pushing by means of the carbon thrust plate 51 until the contact projection 46 of the thrust pad 45 contacts gently or slowly the lower end of the boss portion of the upper bracket 2, and that the thrust pad 45 may be moved stably and exactly.

The lower thrust bearing 13 has a similar structure to the upper thrust bearing 12, except that no coil spring is provided and no washer is used. The lower thrust bearing 13 comprises a plurality of thrust pads 58 each comprising a contact or support projection 59 and a slide contact member. The contact projection 59 positioned in the center of the thrust pad 58 may contact the lower bracket 5. An annular thrust disk 61 is secured to the shaft 8, and an annular carbon thrust plate 63 is attached to the thrust disk 61 via an annular support member 62. A plurality of stopper pins 64 are vertically inserted in the thrust disk 61 and the carbon thrust plate 63 through the support member 62 to prevent the turning of the support member 62 and the carbon thrust plate 63 with respect to the thrust disk 61.

A pair of leg members 65 are attached to the thrust pad 58 on their one ends and each leg member 65 is provided with a slot in the other end. The slotted ends of the leg members 65 project downward into an annular peripheral groove 5a formed in the lower end of a boss portion of the lower bracket 5 through holes formed in the annular projection of the lowermost end of the boss portion of the upper bracket 5, resulting in that the thrust pad 58 is prevented from revolving around the shaft 8. A resilient string ring 66 such as an O-ring is disposed within the annular peripheral groove 5a of the lower bracket 5 through the slots of the leg members 65, thereby suspendably holding the leg members 65 and thus preventing the thrust pad 58 from falling down off the lower bracket 5.

The operation of the submersible electric motor described above will next be described.

A submersible pump unit, for example, is mounted to the upper side of the submersible electric motor by means of bolts, and a switch is turned on to start the operation. On starting, a large upward thrust load is momentarily given to the shaft 8 and thus the shaft 8 is raised. The carbon plate 51 attached to the shaft 8 through the support member 49, the shim 50 and the thrust disk 48 pushes upward the thrust pads 45 of the upper thrust bearing 12 against the pressing forces of the coil springs 54 thereof while the coil springs 54 are compressed. That is, the coil springs 54 absorb the quick upward thrust load given to the shaft 8 on starting, and thus the impact of shock given to the thrust pads 45 of the upper thrust bearing 12 is absorbed by the coil springs 54, resulting in that the contact projections 46 of the thrust pads 45 are moderately contacted with the lower end of the boss portion of the upper bracket 2. On this occasion, since the slide contact pressure between the thrust pads 45 and the carbon thrust plate 51 increases gradually or progressively until the contact projections 46 of the thrust pads 45 contact the lower end of the boss portion of the upper bracket 2, the liquid lubrication between them can be properly maintained during the operation of the electric motor, as compared with an electric motor which is not provided with coil springs in its thrust pads of an upper thrust bearing, wherein a slide contact pressure between the thrust pads and a thrust plate suddenly increases, thereby causing critical lubrication condition.

While the shaft 8 is lifted, the carbon thrust plate 63 attached to the shaft 8 through the support member 62 and the thrust disk 61 is separated from the thrust pads 58 of the lower thrust bearing 13.

Then, the upward thrust given to the shaft 8 decreases while the rotation speed of the shaft 8 varies and the operating condition of the pump unit varies. After passing through a balanced point between the upward thrust and the downward thrust, the downward thrust becomes larger than the upward thrust and the shaft 8 is moved downward. Hence, the downward thrust load is given to the shaft 8 and the shaft 8 is supported by the lower thrust bearing 13. On this occasion, the change of the thrust is not so large as in the case where the upward thrust is given to the shaft 8, and therefore the carbon thrust plate 63 contacts moderately the thrust pads 58 of the lower thrust bearing 13 without any impact or shock. Simultaneously, the thrust pads 45 of the upper thrust bearing 12 are caused to follow the carbon thrust plate 51 moving downwards together with the thrust disk 48 and the support member 49 by the coil springs 54.

When an pump is operated in the excess flow amount range at a larger rotation speed of the shaft 8 than the designed maximum speed at the operation point of the pump, an upward thrust load is given to the shaft 8, although this load is not so sudden as that following starting. This upward thrust load is absorbed by the coil springs 54 of the upper thrust bearing 12 in the same manner as after the starting of the pump, as described above. Since the upper thrust bearing 12 has the same size and is of the same type as that of the lower thrust bearing 13, the upward thrust is safely supported by the upper thrust bearing 12, thereby continuously operating the pump even in its excess flow amount range.

Although the coil springs are used only in the upper thrust bearing 12 in the preferred embodiment described above, however, of course, the coil springs may be applicable in the lower thrust bearing 13 together with the washers to make its construction the same as the upper thrust bearing depending on a pump type to be coupled to the submersible electric motor according to the present invention, such as one in which a downward thrust load is suddenly added to the motor shaft. In such an embodiment, it is necessary to make the pressing force of the coil springs of the upper thrust bearing larger than that of the lower thrust bearing in any positions. Otherwise, it may happen that an upward thrust load is suddenly given to the upper thrust bearing. Further, the support members 49 and 62 of the upper and the lower thrust bearings 12 and 13 may be omitted, as occasion demands, according to the present invention.

Figure 4:
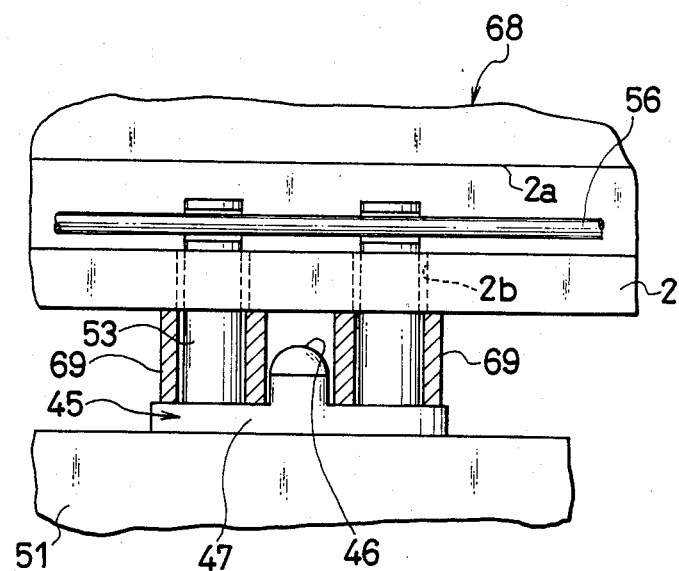
FIG. 4 is an enlarged fragmentary elevational view, like FIG. 2, of another embodiment of a thrust bearing of the submersible electric motor of FIG. 1.

Further, although the coil springs are used as resilient means for biasing the thrust pads of the upper thrust bearing towards the carbon thrust plate secured to the motor shaft through the support member, the shim and the thrust disk; however, another proper means may be applied; for example, rubber bushings 69 may be used in another upper thrust bearing 68, as shown in FIG. 4. Further, a hydraulic damper may be provided in combination with resilient means such as coil springs and rubber bushings in the upper thrust bearing.

It is readily understood from the above description of the preferred embodiment of the present invention that, since the floating type of upper and lower thrust bearings are employed, when applied to the submersible pump or the like, a large upward thrust load can be supported by the upper thrust bearing, and the pump can be continuously operated in the excess flow amount range of the rotation speed of the motor shaft. Further, according to the present invention, since the thrust pads of the upper thrust bearing suspension mounted to the frame of the electric motor are biased towards the upper thrust carbon plate attached to the shaft through the support member, the shim and the thrust disk, by means of the resilient means such as the coil springs and the rubber bushings, the upward thrust suddenly given to the shaft on the starting of the electric motor can be absorbed effectively.

Although the present invention has been described in its preferred embodiments, however, it is understood that various changes and modifications may be made in the invention without departing from the spirit and scope thereof.

What is claimed is:

1. A thrust bearing for supporting an upward thrust given to an upright motor shaft of an electric motor, comprising:
    thrust pads of the thrust bearing, suspension mounted to a frame of the electric motor; and
    resilient means for biasing the thrust pads of the thrust bearing towards a slide contact member secured to the motor shaft, wherein said slide contact member comprises an annular carbon thrust plate and an annular thrust disc.

2. A submersible electric motor for use in submersible pump, in which an upright motor shaft is supported by upper and lower thrust bearings for supporting upward and downward thrust loads, respectively, and thrust pads of the upper and lower thrust bearings receive upper and lower slide contact members secured to the motor shaft in its upper and lower portions, the improvement comprising:
    thrust pads of the upper thrust bearing, suspension mounted to a frame of the electric motor; and
    resilient means for biasing the thrust pads of the upper thrust bearing towards the upper slide contact member secured to the motor shaft,
    wherein said upper slide contact member comprises an annular carbon thrust plate and an annular thrust disc.

3. A submersible electric motor for use in submersible pump, in which an upright motor shaft is supported by upper and lower thrust bearings for supporting upward and downward thrust loads, respectively, and thrust pads of the upper and lower thrust bearings receive upper and lower slide contact members secured to the motor shaft in its upper and lower portions, the improvement comprising:
    thrust pads of the upper thrust bearing, suspension mounted to a frame of the electric motor; and
    resilient means for biasing the thrust pads of the upper thrust bearing towards the upper slide contact member secured to the motor shaft,
    wherein each thrust pad is suspension mounted to the lower end of a boss portion of an upper bracket through leg members, each said leg member having a slot in one end thereof projecting into an annular peripheral groove formed in the lower end of the boss portion of the upper bracket through holes formed in an annular projection of said lowermost end of the boss portion of the upper bracket, and a resilient string ring disposed within the annular peripheral groove of the upper bracket through the slots of the leg members.

4. A submersible electric motor as defined in claim 2 or 3, wherein the resilient means comprise coil springs.

5. A submersible electric motor as defined in claim 2 or 3, wherein the resilient means comprise rubber bushings.

6. A submersible elecric motor as defined in claim 2, wherein an annular shim is interposed between the annular carbon thrust plate and the annular thrust disk.

7. A thrust bearing for supporting an upward thrust given to an upright motor shaft of an electric motor, comprising:
    thrust pads of the thrust bearing, suspension mounted to a frame of the electric motor; and
    resilient means for biasing the thrust pads of the thrust bearing towards a slide contact member secured to the motor shaft,
    wherein each thrust pad is suspension mounted to the lower end of a boss portion of an upper bracket through leg members, each said leg member having a slot in one end thereof projecting into an annular peripheral groove formed in the lower end of the boss portion of the upper bracket through holes formed in an annular projection of the lowermost end of the boss portion of the upper bracket, and a resilient string ring disposed within the annular peripheral groove of the upper bracket through the slots of the leg members.

8. A bearing as defined in claim 3 or 7, wherein the resilient means comprise coil springs.

9. A bearing as defined in claim 3 or 7, wherein the resilient means comprise rubber bushings.

10. A bearing as defined in claim 3, wherein an annular shim is interposed between the annular carbon thrust plate and the annular thrust disk.

* * * * *